United States Patent
Lin et al.

(10) Patent No.: US 10,177,670 B1
(45) Date of Patent: Jan. 8, 2019

(54) FLYBACK POWER CONVERTER CIRCUIT WITH ACTIVE CLAMPING AND CONVERSION CONTROL CIRCUIT AND CONTROL METHOD THEREOF

(71) Applicant: RICHTEK TECHNOLOGY CORPORATION, Zhubei, Hsinchu (TW)

(72) Inventors: Tzu-Chen Lin, Taipei (TW); Kun-Yu Lin, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/965,915

(22) Filed: Apr. 28, 2018

(30) Foreign Application Priority Data

Oct. 16, 2017 (TW) .............................. 106135374 A

(51) Int. Cl.
    H02M 3/335    (2006.01)
    H02M 1/08     (2006.01)
    H02M 1/00     (2006.01)

(52) U.S. Cl.
     CPC ....... *H02M 3/33569* (2013.01); *H02M 1/083* (2013.01); *H02M 2001/0058* (2013.01)

(58) Field of Classification Search
     CPC ............. H02M 3/335; H02M 3/33507; H02M 3/33569; H02M 3/33576; H02M 21/083; H02M 2001/0058
     See application file for complete search history.

(56) References Cited

U.S. PATENT DOCUMENTS

| | | | |
|---|---|---|---|
| 5,570,278 A | | 10/1996 | Cross |
| 6,005,782 A | * | 12/1999 | Jain ......................... H02M 1/34 323/235 |
| 9,391,528 B2 | * | 7/2016 | Yang .................. H02M 3/33569 |
| 2014/0226367 A1 | * | 8/2014 | Hu ..................... H02M 3/33569 363/21.04 |
| 2015/0003121 A1 | * | 1/2015 | Yang ................. H02M 3/33523 363/21.17 |
| 2017/0054375 A1 | * | 2/2017 | Phadke ............. H02M 3/33569 |

FOREIGN PATENT DOCUMENTS

CN            101572490 B        5/2012

* cited by examiner

*Primary Examiner* — Matthew Nguyen
(74) *Attorney, Agent, or Firm* — Tung & Associates

(57) ABSTRACT

A flyback power converter circuit includes: a transformer including a primary winding coupled to an input power and a secondary winding coupled to an output node, a primary side switch controlling the primary side winding to convert the input power to an output power on the output node through the secondary side winding, a clamping circuit including an auxiliary switch and an auxiliary capacitor connected in series to form an auxiliary branch which is connected with the primary side winding in parallel, and a conversion control circuit for adjusting an auxiliary ON time of the auxiliary switch during an OFF time of the primary side switch according to an estimated parasitic diode conduction time of a parasitic diode of the auxiliary switch; the auxiliary ON time is controlled to be substantially equal to and coincides with the estimated parasitic diode conduction time.

24 Claims, 2 Drawing Sheets

FLYBACK POWER CONVERTER CIRCUIT WITH ACTIVE CLAMPING AND CONVERSION CONTROL CIRCUIT AND CONTROL METHOD THEREOF

CROSS REFERENCE

The present invention claims priority to TW106135374, filed on Oct. 16, 2017.

BACKGROUND OF THE INVENTION

Field of Invention

The present invention relates to a flyback power converter circuit. Particularly, it relates to a flyback power converter circuit with active clamping. The present invention also relates to a conversion control circuit and a control method for use in the flyback power converter circuit.

Description of Related Art

FIG. 1 shows a prior art flyback power converter circuit with active clamping (flyback power converter circuit 1) disclosed in U.S. Pat. No. 5,570,278. The flyback power converter circuit 1 converts an input voltage to an output voltage. The flyback power converter circuit 1 includes an auxiliary switch S2 and an auxiliary capacitor Cr which form an active clamping branch. The active clamping branch is conductive when the primary side switch S1 is OFF, such that the energy stored in the parasitic leakage inductance Lr and the parasitic magnetizing inductance Lm during the ON time of the primary side switch S1 can be transferred and stored in the auxiliary capacitor Cr by this branch. Besides, before the primary side switch S1 is turned ON, the parasitic capacitor Coss of the primary side switch S1 can be discharged by the charge stored in the auxiliary capacitor Cr, such that the primary side switch S1 is zero voltage switching when S1 turns ON. Also referring to FIG. 2A, in this prior art, the auxiliary switch S2 switches in opposite phase (i.e. complementarily) with the primary side switch S1.

The prior art circuit in FIG. 1 has a drawback that, because the auxiliary switch S2 switches in opposite phase with the primary side switch S1, the ON time of the auxiliary switch S2 may be too long to cause a large circulation current, leading to high power loss.

FIG. 2B shows schematic waveforms of another prior art flyback power converter circuit with active clamping, disclosed in CN 101572490B. This prior art is similar to FIG. 1 but is different in that the ON time of the auxiliary switch S2 is not in opposite phase with the primary side switch S1. In this prior art, the auxiliary switch S2 is conductive before the primary side switch S1 turns ON and the ON time TONA of the auxiliary switch S2 is a constant time period (constant ON time).

The prior art circuit in FIG. 2B has a drawback that, because the ON time TONA of the auxiliary switch S2 is a fixed time period, when for example in applications with a high input voltage VI, the ON time TONA of the auxiliary switch S2 may not be long enough to fully discharge the parasitic capacitor Coss, and in this case the primary side switch S1 cannot achieve zero voltage switching when S1 turns ON, leading to undesired power loss. Besides, in this prior art, during the beginning of the OFF time of the primary side switch S1, the parasitic diode D2 of the auxiliary switch S2 might be conductive. For example, as shown in FIG. 2B, during the time period TOD2, the auxiliary capacitor current ICr is conducted by the parasitic diode D2. And due to the reverse recovery charge (Qrr) effect, the actual charges stored in the auxiliary capacitor Cr will be less than expected and hence may be insufficient for the primary side switch S1 to achieve zero voltage switching. On the other hand, if a switch with smaller Qrr (for example a GaAs switch) is chosen to avoid the drawback described above, the forward bias voltage of such a switch is typically larger to cause undesired power loss.

Compared to the prior art in FIGS. 1 and 2A-2B, the present invention is advantageous in that the ON time TONA of the auxiliary switch S2 is adjustable to ensure that the primary side switch S1 switches by zero voltage switching, whereby the power conversion efficiency can be improved. Furthermore, the auxiliary switch S2 of the present invention is conductive during the estimated conduction time period of the parasitic diode D2, which can effectively mitigate the Qrr effect and reduce the power loss caused by the forward voltage of the parasitic diode D2.

SUMMARY OF THE INVENTION

From one perspective, the present invention provides a flyback power converter circuit, comprising: a transformer, which includes a primary side winding coupled to an input power and a secondary side winding coupled to an output node; a primary side switch, coupled to the primary side winding, and configured to operably control the primary side winding to convert the input power such that the secondary side winding generates an output power on the output node; a clamping circuit, including: an auxiliary switch, which includes a parasitic diode; and an auxiliary capacitor, coupled to the auxiliary switch in series to form an auxiliary branch which is coupled with the primary side winding in parallel; and a conversion control circuit, configured to operably control the primary side switch and the auxiliary switch to convert the input power to the output power, wherein the auxiliary switch and the primary side switch do not switch complementarily to each other, the conversion control circuit including: a power switch control circuit, configured to operably generate a primary side switch control signal to control the primary side switch; and an auxiliary switch control circuit, configured to operably generate an auxiliary switch control signal to control the auxiliary switch to be conductive for a first auxiliary ON time during a primary OFF time of the primary side switch according to an estimated conduction time of the parasitic diode, wherein the first auxiliary ON time is substantially equal to and coincides with the estimated conduction time.

In one embodiment, during the primary OFF time, the auxiliary switch control circuit further controls the auxiliary switch to be conductive for a second auxiliary ON time after the first auxiliary ON time.

In one embodiment, the auxiliary switch control circuit determines the second auxiliary ON time according to at least one of the followings: (1) a current related signal, (2) the input voltage, and (3) the output voltage; wherein the current related signal relates to at least one of the followings: (1) an output current of the output power, (2) a conduction current of the primary side switch, and (3) the primary side winding current.

In one embodiment, the first auxiliary ON time does not overlap the second auxiliary ON time, and the auxiliary switch is not conductive between the first auxiliary ON time and the second auxiliary ON time.

In one embodiment, the auxiliary switch control circuit further adjusts the first auxiliary ON time to have substantially the same time length as the second auxiliary ON time.

In one embodiment, the auxiliary switch control circuit further controls the first auxiliary ON time to start from substantially the same time point at which the primary OFF time starts, and controls the second auxiliary ON time to end at substantially the same time point at which the primary OFF time ends.

In one embodiment, when a conduction current of the auxiliary switch approaches substantially 0, the auxiliary switch is controlled to be OFF.

In one embodiment, the power switch control circuit controls a primary side ON time of the primary side switch by feedback control according to the output power.

From another perspective, the present invention provides a conversion control circuit, configured to operably control a flyback power converter circuit, wherein the flyback power converter circuit includes: a transformer, which includes a primary side winding coupled to an input power and a secondary side winding coupled to an output node; a primary side switch, coupled to the primary side winding, and configured to operably control the primary side winding to convert the input power such that the secondary side winding generates an output power on the output node; a clamping circuit, including: an auxiliary switch, which includes a parasitic diode; and an auxiliary capacitor, coupled to the auxiliary switch in series to form an auxiliary branch which is coupled with the primary side winding in parallel; wherein the conversion control circuit is configured to operably control the primary side switch and the auxiliary switch to convert the input power to the output power, wherein the auxiliary switch and the primary side switch do not switch complementarily to each other; the conversion control circuit comprising: a power switch control circuit, configured to operably generate a primary side switch control signal to control the primary side switch; and an auxiliary switch control circuit, configured to operably generate an auxiliary switch control signal to control the auxiliary switch to be conductive for a first auxiliary ON time during a primary OFF time of the primary side switch according to an estimated conduction time of the parasitic diode, wherein the first auxiliary ON time is substantially equal to and coincides with the estimated conduction time.

From another perspective, the present invention provides a control method for use in controlling a flyback power converter circuit, wherein the flyback power converter circuit includes: a transformer, which includes a primary side winding coupled to an input power and a secondary side winding coupled to an output node; a primary side switch, coupled to the primary side winding, and configured to operably control the primary side winding to convert the input power such that the secondary side winding generates an output power on the output node; a clamping circuit, including: an auxiliary switch, which includes a parasitic diode; and an auxiliary capacitor, coupled to the auxiliary switch in series to form an auxiliary branch which is coupled with the primary side winding in parallel; the control method comprising: controlling the primary side switch and the auxiliary switch to convert the input power to the output power, wherein the auxiliary switch and the primary side switch do not switch complementarily to each other; and controlling the auxiliary switch to be conductive for a first auxiliary ON time during a primary OFF time of the primary side switch according to an estimated conduction time of the parasitic diode, wherein the first auxiliary ON time is substantially equal to and coincides with the estimated conduction time.

In one embodiment, the control method further comprises: during the primary OFF time, controlling the auxiliary switch to be conductive for a second auxiliary ON time after the first auxiliary ON time.

In one embodiment, the second auxiliary ON time is determined according to at least one of the followings: (1) a current related signal, (2) the input voltage, and (3) the output voltage; wherein the current related signal relates to at least one of the followings: (1) an output current of the output power, (2) a conduction current of the primary side switch, and (3) the primary side winding current.

In one embodiment, the control method further comprises: controlling the auxiliary switch to be not conductive between the first auxiliary ON time and the second auxiliary ON time, wherein the first auxiliary ON time does not overlap the second auxiliary ON time.

In one embodiment, the control method further comprises: adjusting the first auxiliary ON time to have substantially the same time length as the second auxiliary ON time.

In one embodiment, the control method further comprises: controlling the first auxiliary ON time to start from substantially the same time point at which the primary OFF time starts, and controlling the second auxiliary ON time to end at substantially the same time point at which the primary OFF time ends.

In one embodiment, the control method further comprises: controlling the auxiliary switch to be OFF when a conduction current of the auxiliary switch approaches substantially 0.

In one embodiment, the control method further comprises: controlling a primary side ON time of the primary side switch by feedback control according to the output power.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
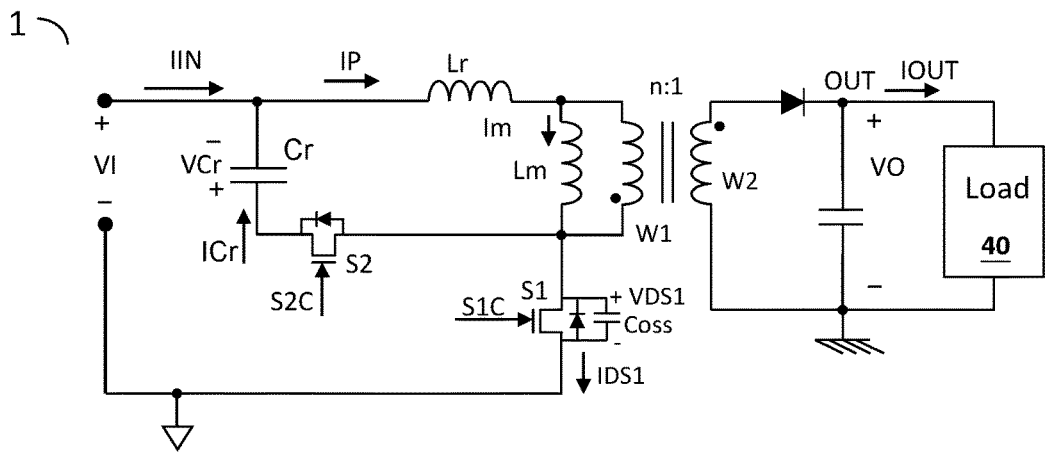
FIG. 1 shows a schematic diagram of a prior art flyback power converter circuit with active clamping.
Figure 2A:
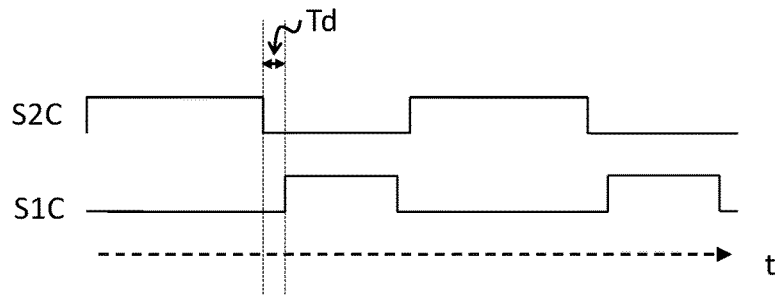
FIGS. 2A and 2B show schematic waveforms of prior art flyback power converter circuits with active clamping.
Figure 2B:
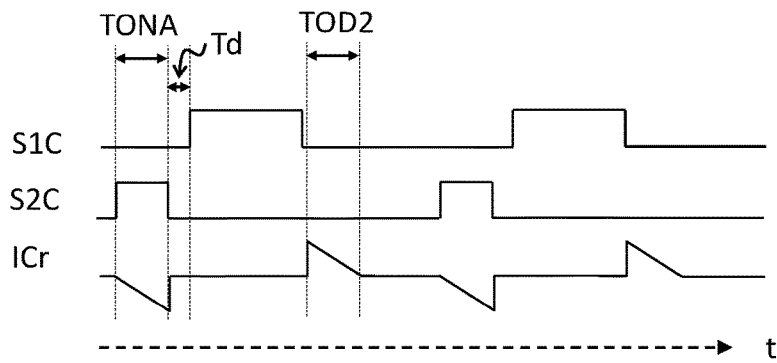
Figure 3:
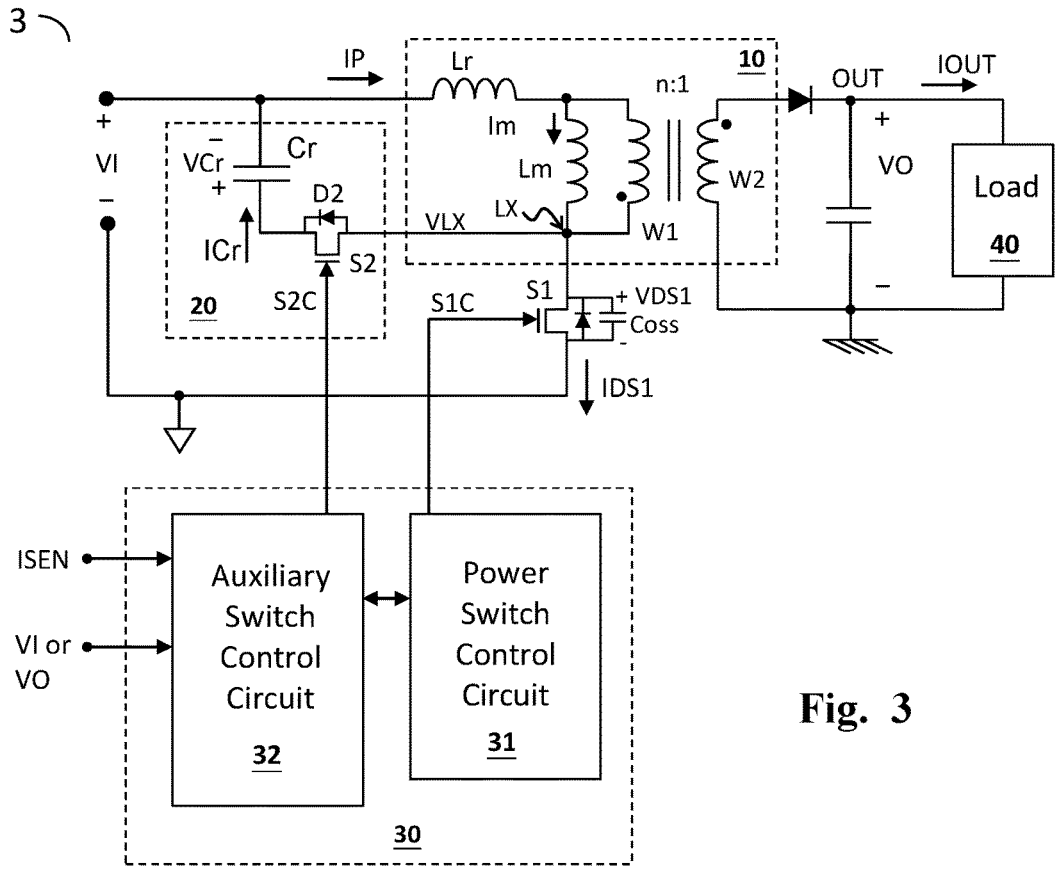
FIG. 3 shows a schematic diagram of an embodiment of the flyback power converter circuit according to the present invention.

FIG. 3 shows one embodiment of the flyback power converter circuit with active clamping according to the present invention (flyback power converter circuit 3). The flyback power converter circuit 3 comprises a transformer 10, a primary side switch S1, a clamping circuit 20, and a conversion control circuit 30. The transformer 10 includes a primary side winding W1 which is coupled to an input power, and a secondary side winding W2 which is coupled to an output node OUT, wherein the input power includes an input voltage VI and an input current IIN. The primary side switch S1 is coupled to the primary side winding W1, and is configured to operably control the primary side winding W1 to convert the input power such that the secondary side winding W2 generates an output power on the output node OUT for supplying the output power to a load 40, wherein the output power includes an output voltage VO and an output current IOUT.

Still referring to FIG. 3, the clamping circuit 20 includes an auxiliary switch S2 and an auxiliary capacitor Cr. The auxiliary switch S2 is coupled to the auxiliary capacitor Cr in series to form an auxiliary branch which is coupled with the primary side winding W1 in parallel as shown in FIG. 3. The conversion control circuit 30 controls the primary side switch S1 and the auxiliary switch S2 to convert the input power to the output power. The conversion control circuit 30 includes a power switch control circuit 31 and an auxiliary switch control circuit 32. The power switch control circuit 31 generates a primary side switch control signal S1C to control the primary side switch S1 by primary side feedback control or secondary side feedback control. The auxiliary switch control circuit 32 generates an auxiliary switch control signal S2C to control the auxiliary switch S2.

Still referring to FIG. 3, the auxiliary switch S2 includes a parasitic diode D2. During a primary OFF time TOFF1 of the primary side switch S1 (i.e. the time period when S1 is OFF), the auxiliary switch control circuit 32 controls the auxiliary switch S2 to be conductive for a first auxiliary ON time TON2 according to an estimated conduction time of the parasitic diode D2, wherein the first auxiliary ON time TON2 is substantially equal to and coincides with the estimated conduction time of the parasitic diode D2, such that the Qrr effect of the parasitic diode D2 or the power loss caused by the forward voltage of the parasitic diode D2 can be effectively reduced.

Although the first auxiliary ON time TON2 being exactly equal to and coinciding with the estimated conduction time of the parasitic diode D2 is preferred, however, due to non-idealities caused by for example imperfection of components or imperfect matching among components, or due to delay of signal propagation, the actual first auxiliary ON time TON2 may not be exactly equal to and precisely coincides with the estimated conduction time of the parasitic diode D2, so the term "substantially" is used to express that a tolerable error is allowable; the same for the use of the term "substantially" throughout the text.

Still referring to FIG. 3, in one embodiment, during another time period (a second auxiliary ON time TON2') when the primary side switch S1 is OFF (i.e. during the primary OFF time), the auxiliary switch control circuit 32 further controls the auxiliary switch S2 to be conductive again, such that the charges stored in the leakage inductance and/or the magnetization inductance of the primary side winding W1 when the primary side switch S1 is ON can be discharged to and stored into the auxiliary capacitor Cr through the auxiliary branch. And, before the primary side switch S1 turns ON, the charges stored in the auxiliary capacitor Cr can discharge the parasitic capacitor Coss of the primary side switch S1. In one embodiment, the primary side switch S1 can achieve zero voltage switching by the conduction of the auxiliary switch S2.

In one embodiment, the auxiliary switch control circuit 32 adjusts the second auxiliary ON time TON2' of the auxiliary switch S2 according to at least one of the followings: (1) a current related signal ISEN, (2) the input voltage VI, and (3) the output voltage VO. In one embodiment, the parameters above are so adjusted that a voltage difference (e.g. VDS1 as shown in FIG. 3) between a current inflow terminal (LX) and a current outflow terminal (which is coupled to a primary side ground node in this embodiment) of the primary side switch S1 is substantially zero when the primary side switch S1 turns ON, whereby zero voltage switching is achieved, wherein the current related signal ISEN relates to at least one of the followings: (1) the output current IOUT, (2) a conduction current IDS1 of the primary side switch S1, and (3) a conduction current IP of the primary side winding W1. In one embodiment, the current related signal ISEN may be obtained by sensing the drain-source voltage VDS1 of the primary side switch S1, the conduction current IDS1 of the primary side switch S1, or a voltage drop across a sensing resistor. "Substantially zero" means that there can be tolerable errors caused by, for example, signal transmission delay.

Figure 4:
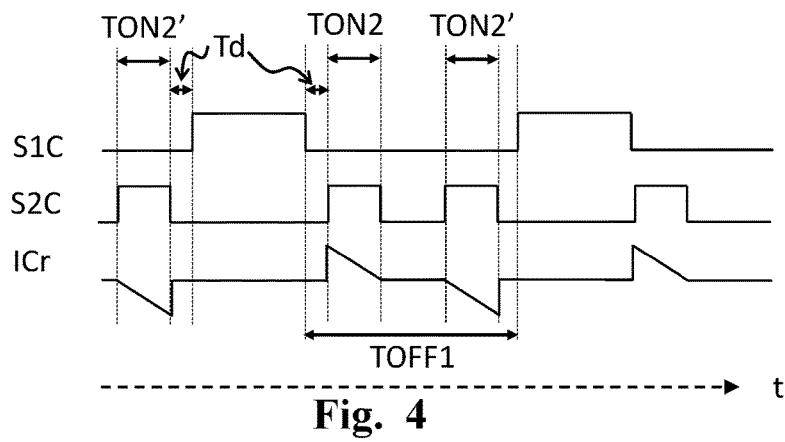
FIG. 4 shows schematic waveforms corresponding to the embodiment as shown in FIG. 3.

Also referring to FIG. 4 which shows schematic waveforms corresponding to the embodiment as shown in FIG. 3, in one embodiment, the first auxiliary ON time TON2 starts at the time point at which the ON time of the primary side switch S1 (i.e. the primary ON time) ends. In other words, the first auxiliary ON time TON2 starts at the same time as the primary OFF time TOFF1 starts. In one embodiment, the auxiliary switch control circuit 32 controls the auxiliary switch S2 to be conductive for the second auxiliary ON time TON2' just before the primary side switch S1 turns ON. In other words, the second auxiliary ON time TON2' substantially ends at the same time point at which the primary OFF time ends. In this embodiment, during the primary OFF time TOFF1, the first auxiliary conduction time TON2 occurs earlier than the second auxiliary conduction time TON2'. Besides, in one embodiment, a dead time TD can be inserted between the primary ON time of the primary side switch S1 and the first auxiliary ON time TON2 of the auxiliary switch S2, and/or between the primary ON time of the primary side switch S1 and the second auxiliary ON time TON2' of the auxiliary switch S2, to ensure no short circuit current is caused by concurrently turning ON both the primary side switch S1 and the auxiliary switch S2.

Still referring to FIG. 4, in one embodiment, the first auxiliary ON time TON2 and the second auxiliary ON time TON2' do not overlap, and the auxiliary switch S2 is OFF between the first auxiliary ON time TON2 and the second auxiliary ON time TON2', whereby the circulation current can be reduced. In other embodiments, the first auxiliary ON time TON2 and the second auxiliary ON time TON2' may overlap, especially when the switching frequency is higher or when the primary OFF time TOFF1 is shorter. It should be considered within the scope of the present invention as long as the first auxiliary ON time TON2 is determined according to the estimated conduction time period of the parasitic diode D2. From another perspective, due to charge conservation, the aforementioned estimated conduction time period of the parasitic diode D2 has substantially the same time length as the second auxiliary ON time TON2'. Hence, according to the present invention, in one embodiment, the auxiliary switch control circuit 32 adjusts the first auxiliary ON time TON2 to have substantially the same time length as the second auxiliary ON time TON2', such that the first auxiliary ON time TON2 is substantially equal to and coincides with the estimated conduction time of the parasitic diode D2, whereby the Qrr effect of the parasitic diode D2 or the power loss caused by the forward voltage of the parasitic diode D2 can be effectively reduced. In one embodiment, when a conduction current of the auxiliary switch S2 approaches substantially 0, the auxiliary switch S2 is controlled to be OFF, whereby the circulation current can be reduced.

Still referring to FIG. 4, from another perspective according to the present invention, in one preferred embodiment, after the primary side switch S1 turns OFF, the auxiliary switch control circuit 32 controls the auxiliary switch S2 to be ON for the first time (corresponding to the first auxiliary ON time TON2), then the auxiliary switch S2 is controlled to be OFF, and then before the primary side switch S1 turns ON, the auxiliary switch S2 is controlled to be ON for the second time (corresponding to the second auxiliary ON time TON2'), and the first auxiliary ON time TON2 is so adjusted that the first auxiliary ON time TON2 has substantially the same time length as the second auxiliary ON time TON2'. Note that during the first auxiliary ON time TON2 as shown in the figure, the auxiliary capacitor current ICr is conducted by the auxiliary switch S2 instead of the parasitic diode D2, whereby the Qrr effect of the parasitic diode D2 or the power loss caused by the forward voltage of the parasitic diode D2 can be effectively reduced. Also note that, in this embodiment, the auxiliary switch S2 and the primary side switch S1 do not switch complementarily to each other.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, "the auxiliary switch being controlled to be conductive for the first time and the second time" can be combined with "the first auxiliary ON time having the same time length as the second auxiliary ON time" and "when a conduction current of the auxiliary switch approaches substantially 0, the auxiliary switch being controlled to be OFF". Furthermore, those skilled in this art can readily conceive variations and modifications within the spirit of the present invention. For example, the determination of the time length of the second auxiliary ON time TON2' is not limited to the embodiments described above. In other embodiments, the second auxiliary ON time TON2' may have a constant time length as the prior art. It should be considered within the scope of the present invention as long as the time length of the first auxiliary ON time TON2 is substantially the same as the second auxiliary ON time TON2'. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A flyback power converter circuit, comprising:
    a transformer, which includes a primary side winding coupled to an input power and a secondary side winding coupled to an output node;
    a primary side switch, coupled to the primary side winding, and configured to operably control the primary side winding to convert the input power such that the secondary side winding generates an output power on the output node;
    a clamping circuit, including:
        an auxiliary switch, which includes a parasitic diode; and
        an auxiliary capacitor, coupled to the auxiliary switch in series to form an auxiliary branch which is coupled with the primary side winding in parallel; and
    a conversion control circuit, configured to operably control the primary side switch and the auxiliary switch to convert the input power to the output power, wherein the auxiliary switch and the primary side switch do not switch complementarily to each other, the conversion control circuit including:
        a power switch control circuit, configured to operably generate a primary side switch control signal to control the primary side switch; and
        an auxiliary switch control circuit, configured to operably generate an auxiliary switch control signal to control the auxiliary switch to be conductive for a first auxiliary ON time during an OFF time of the primary side switch (primary OFF time) according to an estimated conduction time of the parasitic diode, wherein the first auxiliary ON time is substantially equal to and coincides with the estimated conduction time.

2. The flyback power converter circuit of claim 1, wherein during the primary OFF time, the auxiliary switch control circuit further controls the auxiliary switch to be conductive for a second auxiliary ON time after the first auxiliary ON time.

3. The flyback power converter circuit of claim 2, wherein the auxiliary switch control circuit determines the second auxiliary ON time according to at least one of the followings: (1) a current related signal, (2) the input voltage, and (3) the output voltage; wherein the current related signal relates to at least one of the followings: (1) an output current of the output power, (2) a conduction current of the primary side switch, and (3) the primary side winding current.

4. The flyback power converter circuit of claim 2, wherein the first auxiliary ON time does not overlap the second auxiliary ON time, and the auxiliary switch is not conductive between the first auxiliary ON time and the second auxiliary ON time.

5. The flyback power converter circuit of claim 2, wherein the auxiliary switch control circuit further adjusts the first auxiliary ON time to have substantially the same time length as the second auxiliary ON time.

6. The flyback power converter circuit of claim 2, wherein the auxiliary switch control circuit further controls the first auxiliary ON time to start from substantially the same time point at which the primary OFF time starts, and controls the second auxiliary ON time to end at substantially the same time point at which the primary OFF time ends.

7. The flyback power converter circuit of claim 1, wherein when a conduction current of the auxiliary switch approaches substantially 0, the auxiliary switch is controlled to be OFF.

8. The flyback power converter circuit of claim 1, wherein the power switch control circuit controls a primary side ON time of the primary side switch by feedback control according to the output power.

9. A conversion control circuit, configured to operably control a flyback power converter circuit, wherein the flyback power converter circuit includes: a transformer, which includes a primary side winding coupled to an input power and a secondary side winding coupled to an output node; a primary side switch, coupled to the primary side winding, and configured to operably control the primary side winding to convert the input power such that the secondary side winding generates an output power on the output node; a clamping circuit, including: an auxiliary switch, which includes a parasitic diode; and an auxiliary capacitor, coupled to the auxiliary switch in series to form an auxiliary branch which is coupled with the primary side winding in parallel; wherein the conversion control circuit is configured to operably control the primary side switch and the auxiliary switch to convert the input power to the output power, wherein the auxiliary switch and the primary side switch do not switch complementarily to each other; the conversion control circuit comprising:
 a power switch control circuit, configured to operably generate a primary side switch control signal to control the primary side switch; and
 an auxiliary switch control circuit, configured to operably generate an auxiliary switch control signal to control the auxiliary switch to be conductive for a first auxiliary ON time during an OFF time of the primary side switch (primary OFF time) according to an estimated conduction time of the parasitic diode, wherein the first auxiliary ON time is substantially equal to and coincides with the estimated conduction time.

10. The conversion control circuit of claim 9, wherein during the primary OFF time, the auxiliary switch control circuit further controls the auxiliary switch to be conductive for a second auxiliary ON time after the first auxiliary ON time.

11. The conversion control circuit of claim 10, wherein the auxiliary switch control circuit determines the second auxiliary ON time according to at least one of the followings: (1) a current related signal, (2) the input voltage, and (3) the output voltage; wherein the current related signal relates to at least one of the followings: (1) an output current of the output power, (2) a conduction current of the primary side switch, and (3) the primary side winding current.

12. The conversion control circuit of claim 10, wherein the first auxiliary ON time does not overlap the second auxiliary ON time, and the auxiliary switch is not conductive between the first auxiliary ON time and the second auxiliary ON time.

13. The conversion control circuit of claim 10, wherein the auxiliary switch control circuit further adjusts the first auxiliary ON time to have substantially the same time length as the second auxiliary ON time.

14. The conversion control circuit of claim 10, wherein the auxiliary switch control circuit further controls the first auxiliary ON time to start from substantially the same time point at which the primary OFF time starts, and controls the second auxiliary ON time to end at substantially the same time point at which the primary OFF time ends.

15. The conversion control circuit of claim 9, wherein when a conduction current of the auxiliary switch approaches substantially 0, the auxiliary switch is controlled to be OFF.

16. The conversion control circuit of claim 9, wherein the power switch control circuit controls a primary side ON time of the primary side switch by feedback control according to the output power.

17. A control method for use in controlling a flyback power converter circuit, wherein the flyback power converter circuit includes: a transformer, which includes a primary side winding coupled to an input power and a secondary side winding coupled to an output node; a primary side switch, coupled to the primary side winding, and configured to operably control the primary side winding to convert the input power such that the secondary side winding generates an output power on the output node; a clamping circuit, including: an auxiliary switch, which includes a parasitic diode; and an auxiliary capacitor, coupled to the auxiliary switch in series to form an auxiliary branch which is coupled with the primary side winding in parallel; the control method comprising:
 controlling the primary side switch and the auxiliary switch to convert the input power to the output power, wherein the auxiliary switch and the primary side switch do not switch complementarily to each other; and
 controlling the auxiliary switch to be conductive for a first auxiliary ON time during an OFF time of the primary side switch (primary OFF time) according to an estimated conduction time of the parasitic diode, wherein the first auxiliary ON time is substantially equal to and coincides with the estimated conduction time.

18. The control method of claim 17, further comprising: during the primary OFF time, controlling the auxiliary switch to be conductive for a second auxiliary ON time after the first auxiliary ON time.

19. The control method of claim 18, wherein the second auxiliary ON time is determined according to at least one of the followings: (1) a current related signal, (2) the input voltage, and (3) the output voltage; wherein the current related signal relates to at least one of the followings: (1) an output current of the output power, (2) a conduction current of the primary side switch, and (3) the primary side winding current.

20. The control method of claim 18, further comprising: controlling the auxiliary switch to be not conductive between the first auxiliary ON time and the second auxiliary ON time, wherein the first auxiliary ON time does not overlap the second auxiliary ON time.

21. The control method of claim 18, further comprising: adjusting the first auxiliary ON time to have substantially the same time length as the second auxiliary ON time.

22. The control method of claim 18, further comprising: controlling the first auxiliary ON time to start from substantially the same time point at which the primary OFF time starts, and controlling the second auxiliary ON time to end at substantially the same time point at which the primary OFF time ends.

23. The control method of claim 17, further comprising: controlling the auxiliary switch to be OFF when a conduction current of the auxiliary switch approaches substantially 0.

24. The control method of claim 17, further comprising: controlling a primary side ON time of the primary side switch by feedback control according to the output power.

* * * * *